United States Patent [19]
Hasala

[11] 3,918,185
[45] Nov. 11, 1975

[54] ANIMATED DISPLAY

[76] Inventor: Ernest Hasala, 608 W. Hillsdale Blvd., San Mateo, Calif. 94403

[22] Filed: Feb. 19, 1974

[21] Appl. No.: 443,447

Related U.S. Application Data

[63] Continuation of Ser. No. 286,452, Sept. 5, 1972, abandoned.

[52] U.S. Cl. ..................... 40/106.53; 40/36; 40/137
[51] Int. Cl.² .......................................... G09F 19/14
[58] Field of Search ............ 40/137, 106.51–106.53, 40/65, 30, 36

[56] References Cited
UNITED STATES PATENTS

| | | | |
|---|---|---|---|
| 829,492 | 8/1906 | Spiegel | 40/137 |
| 1,475,430 | 11/1923 | Curwen | 40/137 |
| 2,313,947 | 3/1943 | Klinkum | 40/137 UX |
| 3,000,125 | 9/1961 | Elvestrom | 40/137 |
| 3,082,560 | 3/1963 | Elvestrom | 40/137 |
| 3,484,969 | 12/1969 | Newland | 40/137 X |
| 3,660,919 | 5/1972 | Nagel | 40/78.3 |
| 3,683,525 | 8/1972 | Fukui | 40/137 X |

*Primary Examiner*—Robert W. Michell
*Assistant Examiner*—John F. Pitrelli

[57] ABSTRACT

A display device in which a rear illuminated strip image transparency sheet, and a grid sheet having alternate opaque and transparent strips, are continuously moved mechanically relative to one another, or change their angular disposition relative to a viewer by movement of the viewer or of the device, to produce an "animated" display. The strip images are of greater width than the transparent strips of the grid sheet to produce a visual effect wherein each illuminated view of the display dwells for a brief time and then dissolves gradually into a subsequent view, so that there is an optical "dwell" with no mechanical dwell.

11 Claims, 14 Drawing Figures

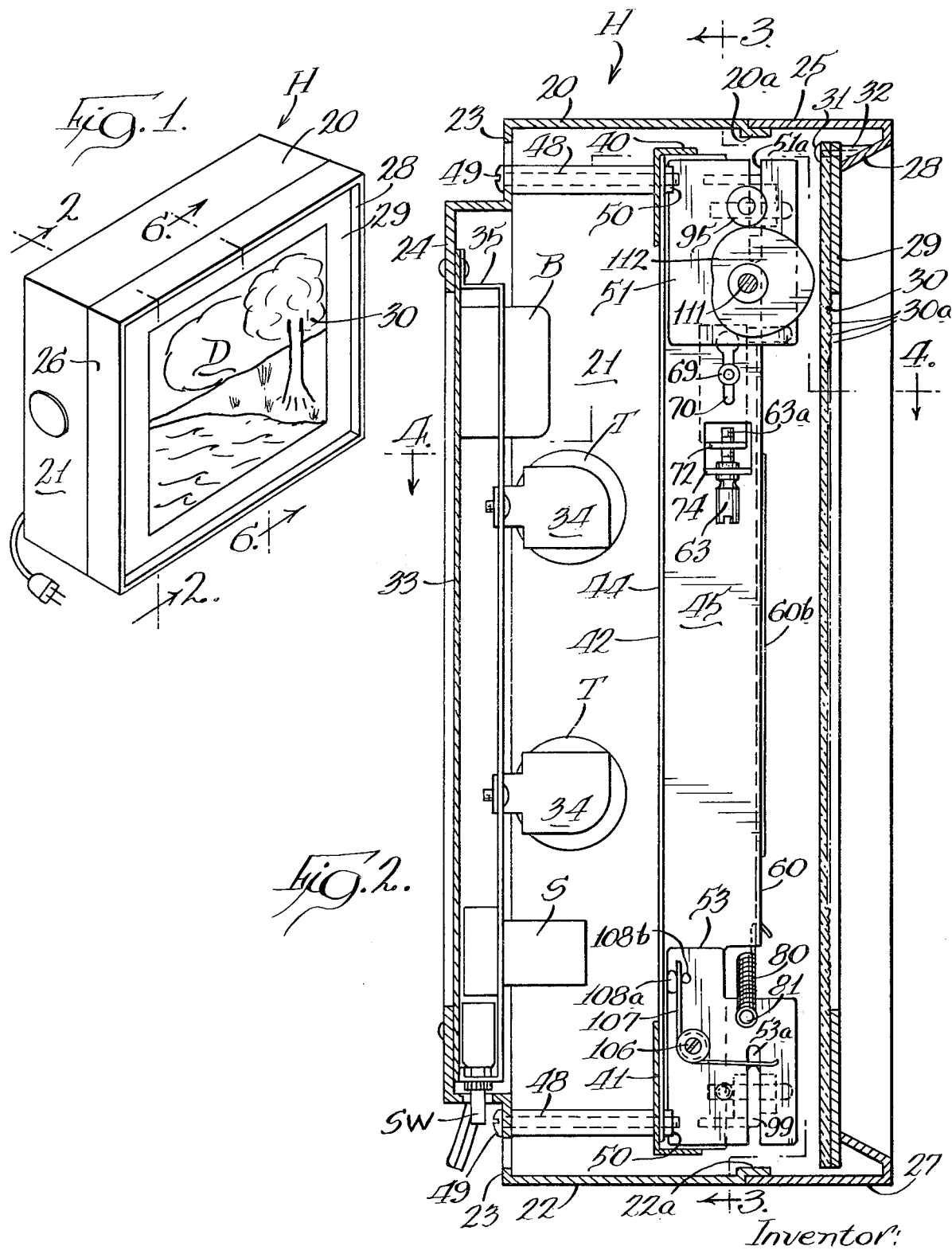

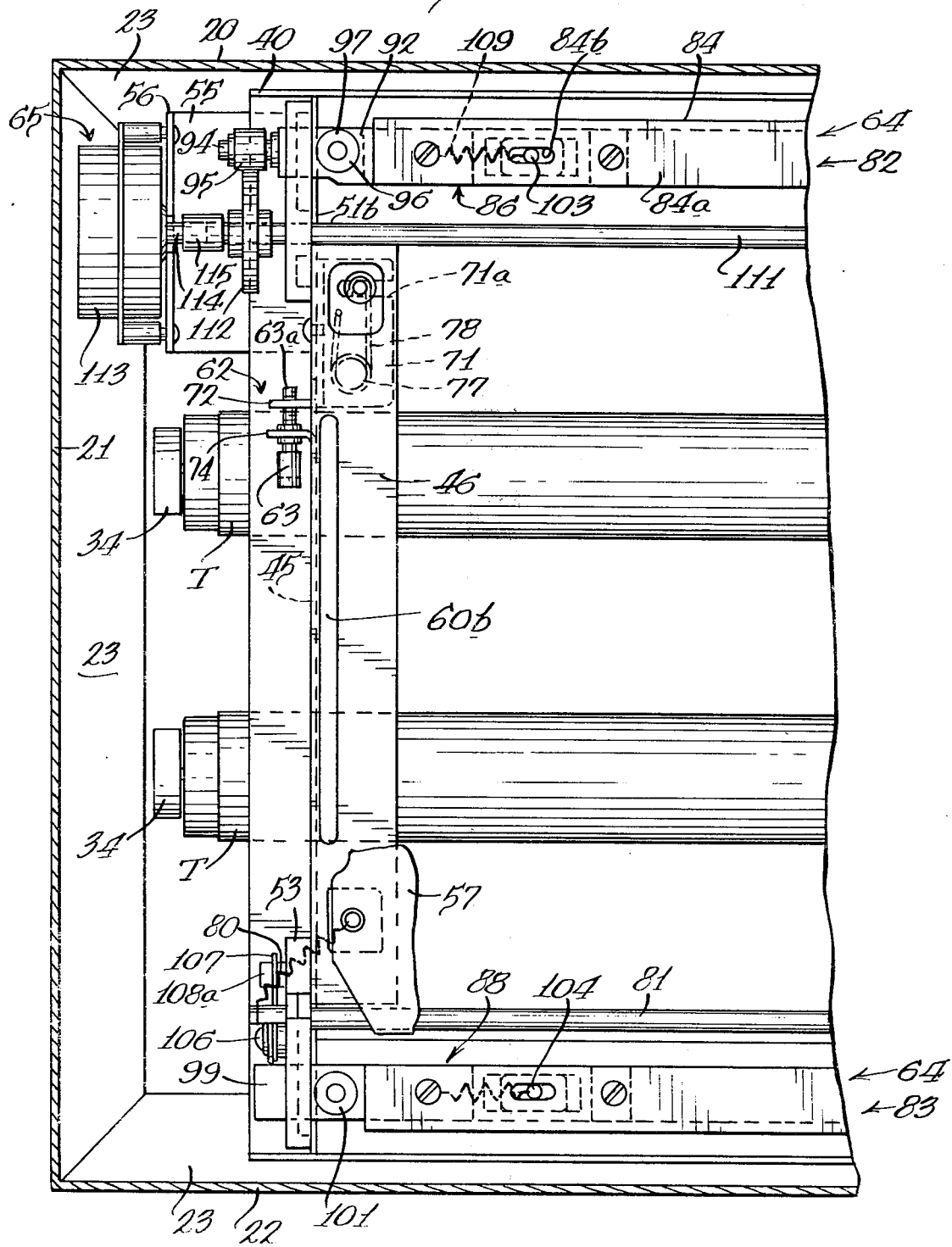

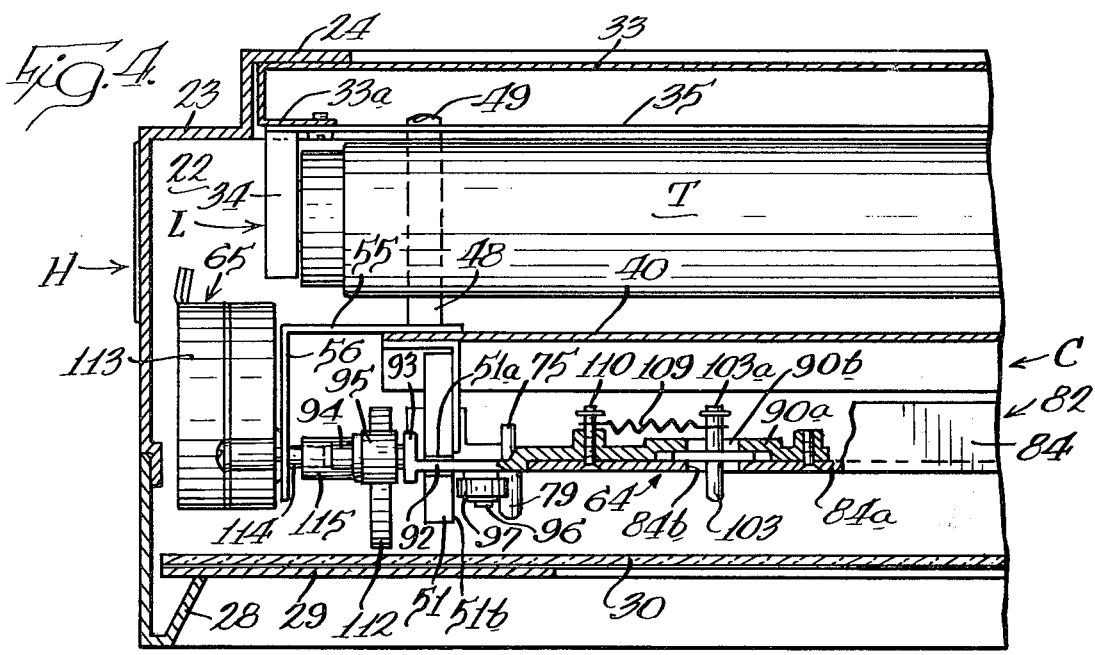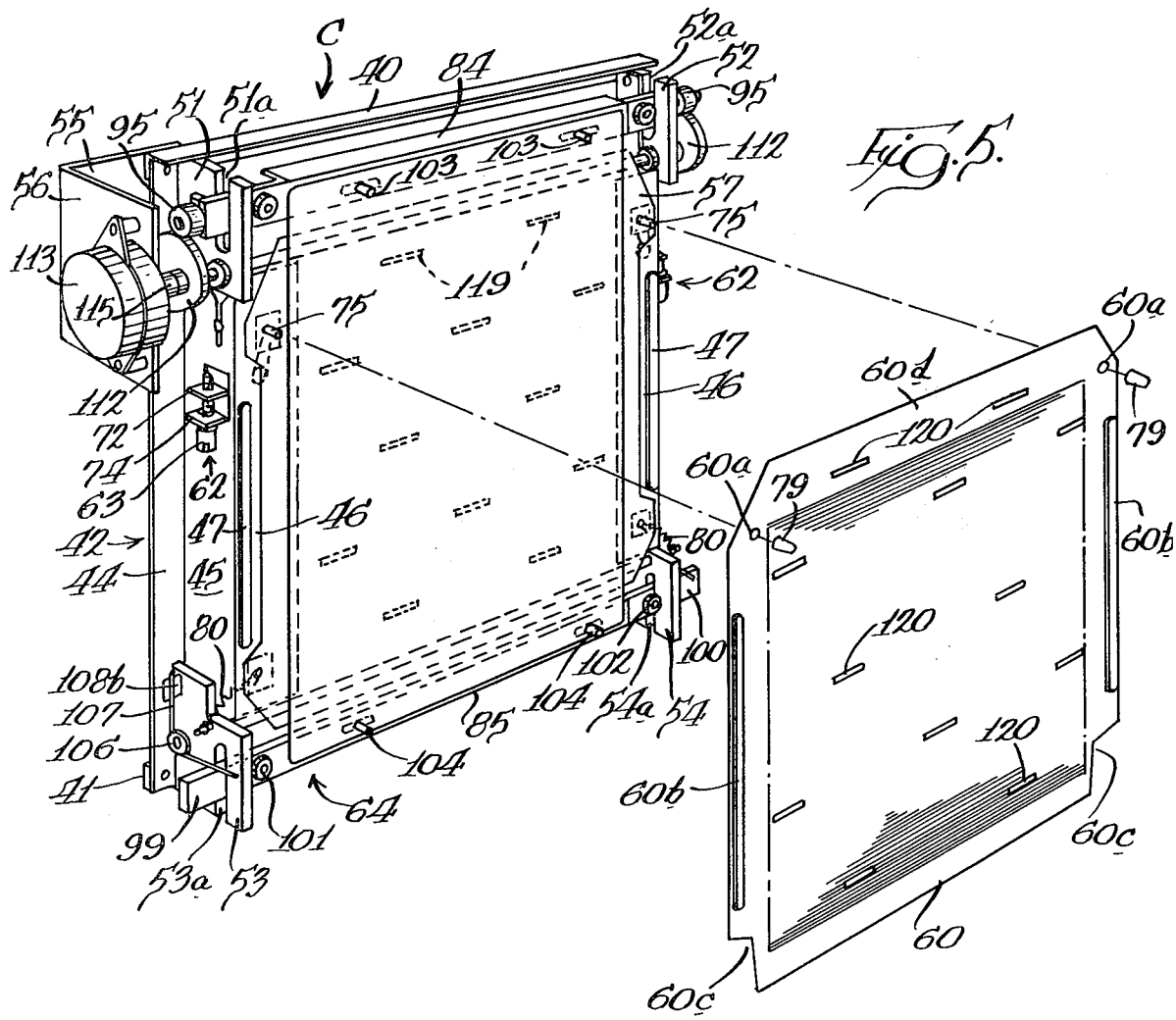

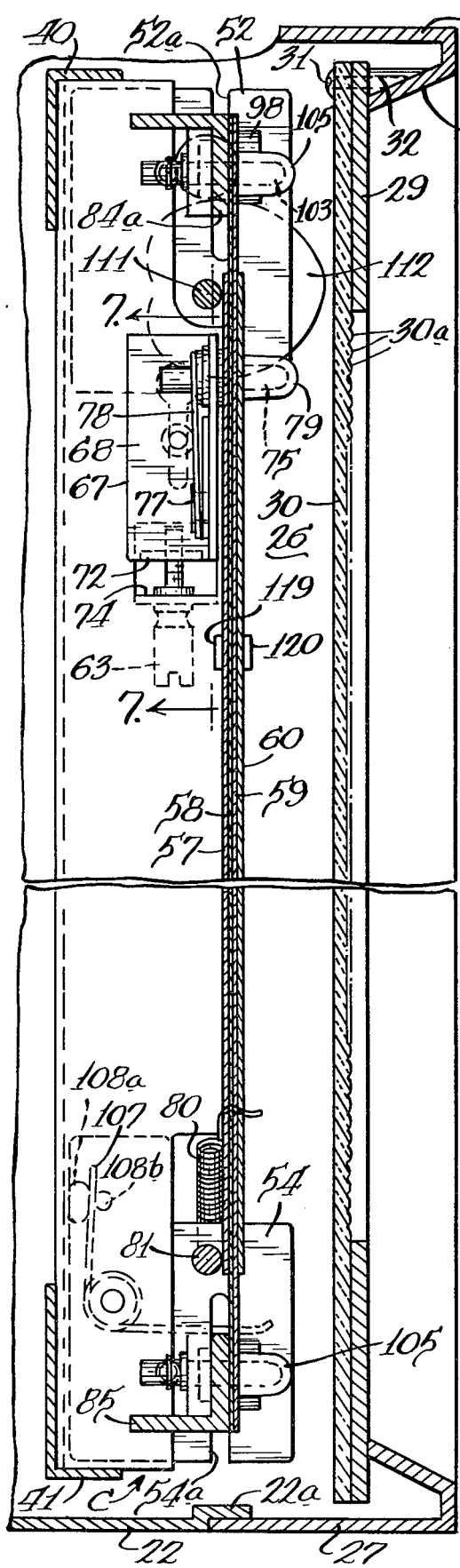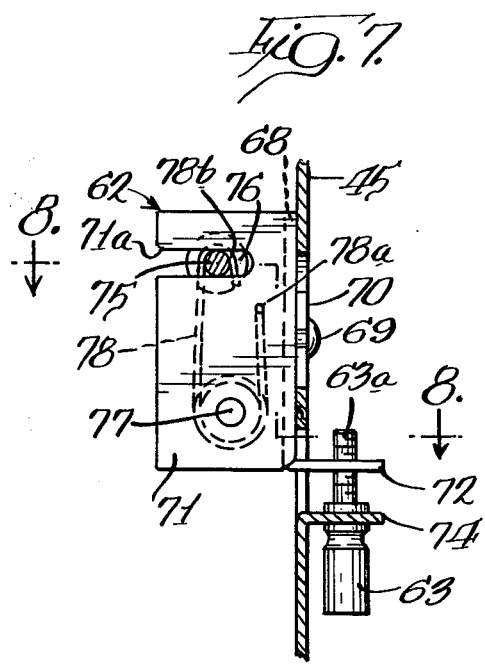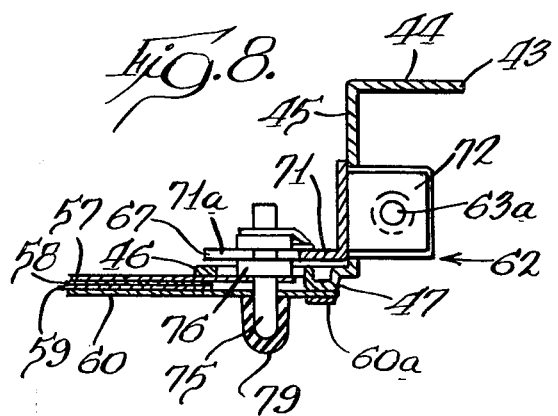

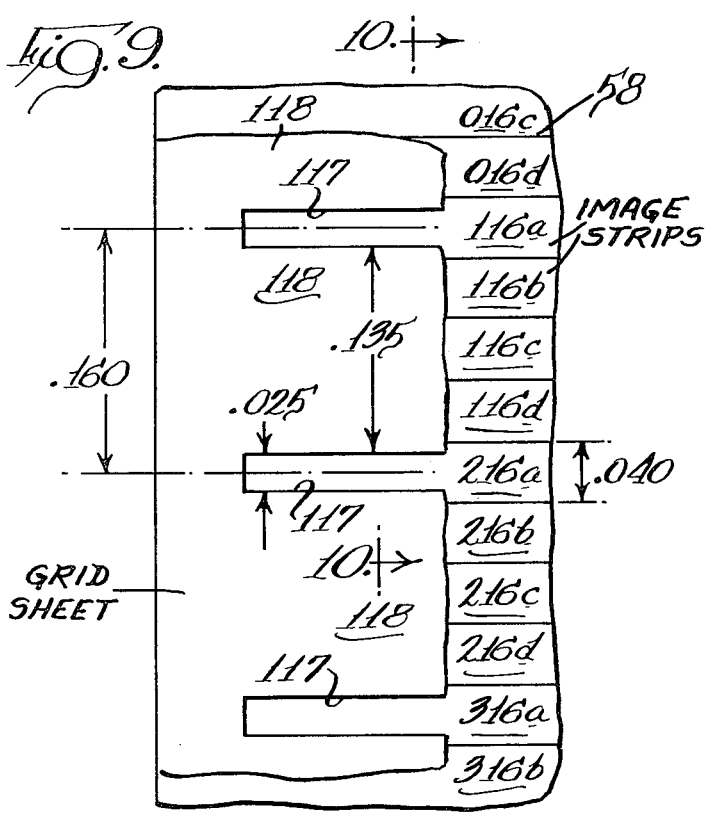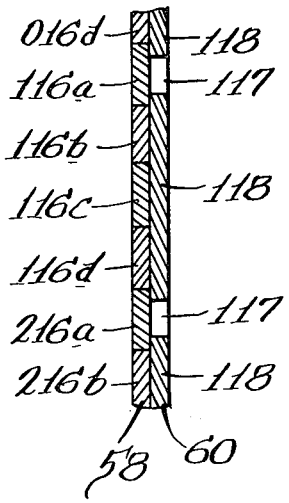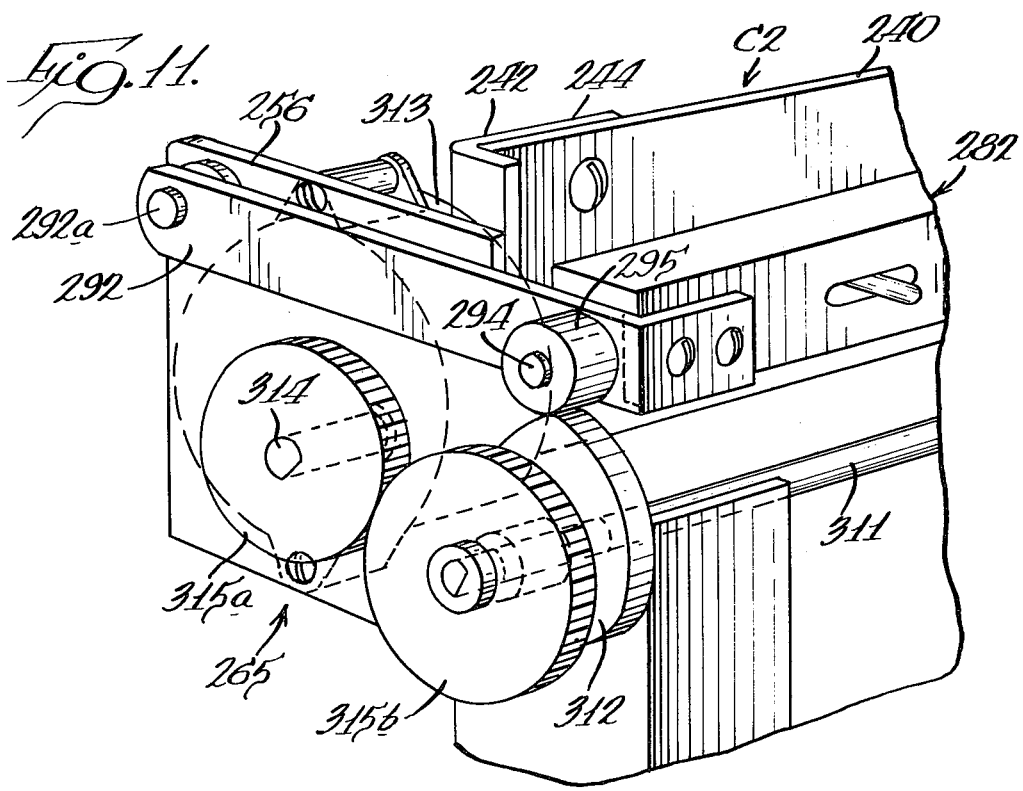

ANIMATED DISPLAY

This is a continuation, of application Ser. No. 286,452 filed Sept. 5, 1972, now abandoned.

CROSS-REFERENCE TO RELATED APPLICATIONS

Novel subject matter disclosed and claimed herein was invented during the development of commercial apparatus based upon the subject matter disclosed and claimed in the co-pending application of Ernest Hasala entitled Illuminated Displays, Ser. No. 79,024 filed Oct. 8, 1970. Application Ser. No. 286,452, filed Sept. 5, 1972, was a continuation-in-part of application of Ernest Hasala, Ser. No. 148,866 filed June 1, 1971 for Animated Display, with which it was copending.

BACKGROUND OF THE INVENTION

Hasala application Ser. No. 79,024 filed Oct. 8, 1970 discloses an animated display device in which diffused light is projected through a program sheet and through a grid sheet having alternate opaque and transparent strips, and the light passing through each of the transparent strips strikes several lenticules of a lenticular screen that is placed forward of and in spaced relationship to the grid sheet. The lenticules expand the light transmitted through each transparent grid strip so that the separate images merge and there is no visible space between them. The transparent program sheet may be shifted to change the light transmitted through the transparent grid strips. By using a strip image color photographic transparency as the program sheet of the foregoing Hasala application, a highly effective animated display device is obtainable.

SUMMARY OF THE INVENTION

The image strips of the strip image transparency of this invention are wider than the transparent strips of the grid sheet so that as the strip image transparency and grid sheet move relative to one another at a slow speed, they produce an animated visual effect in which a first illuminated view appears for a brief time and then gradually dissolves into a second view. The second appears to dwell for a brief time and then gradually dissolves into the next view and so forth.

To maintain the spatial relationship between the grid sheet and strip image transparency sheet and to avoid undesirable parallax effects in one embodiment the strip image transparency sheet and the grid sheet are held together by pairs of magnetic means that hold the strip image transparency sheet between a diffuser film and the grid sheet with or without a slip sheet between them.

The principal object of the present invention is to provide an animated display wherein each particular view dwells a brief time and then gradually dissolves into the subsequent view.

As used herein, the term "animated display" designates a display which produces the visual effect of motion of persons or things depicted in the display, or in which the only visual effect of motion is in the shift from one fixed scene to another, or in which both said visual effects are combined.

As used herein, the term "strip image transparency" designates a transparency having parallel strips arranged in sets in accordance with the pattern "$a$", "$b$", "$c$" ... "$n$", with said sequence repeating, with all the $a$ strips combining to provide a first visual effect, all the $b$ strips combining to produce a second visual effect, etc.

DESCRIPTION OF THE DRAWINGS

FIG. 1 is a perspective view of a display device constructed in accordance with the present invention;

FIG. 2 is a vertical sectional view on an enlarged scale taken substantially as indicated along the line 2—2 of FIG. 1, illustrating a first embodiment of a chassis;

FIG. 3 is a fragmentary transverse vertical sectional view taken substantially as indicated along line 3—3 of FIG. 2;

FIG. 4 is a fragmentary horizontal sectional view taken substantially as indicated along the line 4—4 of FIG. 2;

FIG. 5 is a perspective view on a reduced scale illustrating the chassis which includes the structure for mounting the diffuser film, the strip image sheet, and the grid sheet, for adjusting the grid sheet, and for reciprocating the strip image sheet, with the grid sheet removed for clarity of illustration;

FIG. 6 is a broken vertical sectional view on an enlarged scale taken substantially as indicated along the line 6—6 of FIG. 1;

FIG. 7 is a fragmentary sectional view taken substantially as illustrated along the line 7—7 of FIG. 6;

FIG. 8 is a fragmentary sectional view taken substantially as indicated along the line 8—8 of FIG. 7;

FIG. 9 is a fragmentary elevational view on a greatly enlarged scale (enlarged about ten times) showing the relationship between the image strip of the strip image transparency sheet and the alternate opaque and transparent strips of the grid sheet;

FIG. 10 is a fragmentary section taken substantially as indicated along the line 10—10 of FIG. 9 with the transparent slip sheet eliminated to better illustrate the relationship between the image strips and the grid.

FIG. 10A is the same view as FIG. 10 but with a slip sheet of substantial thickness in place;

FIG. 11 is a fragmentary perspective view on an enlarged scale illustrating a second chassis structure for mounting and guiding the top of the strip image sheet;

DETAILED DESCRIPTION OF THE INVENTION

Figure 12:
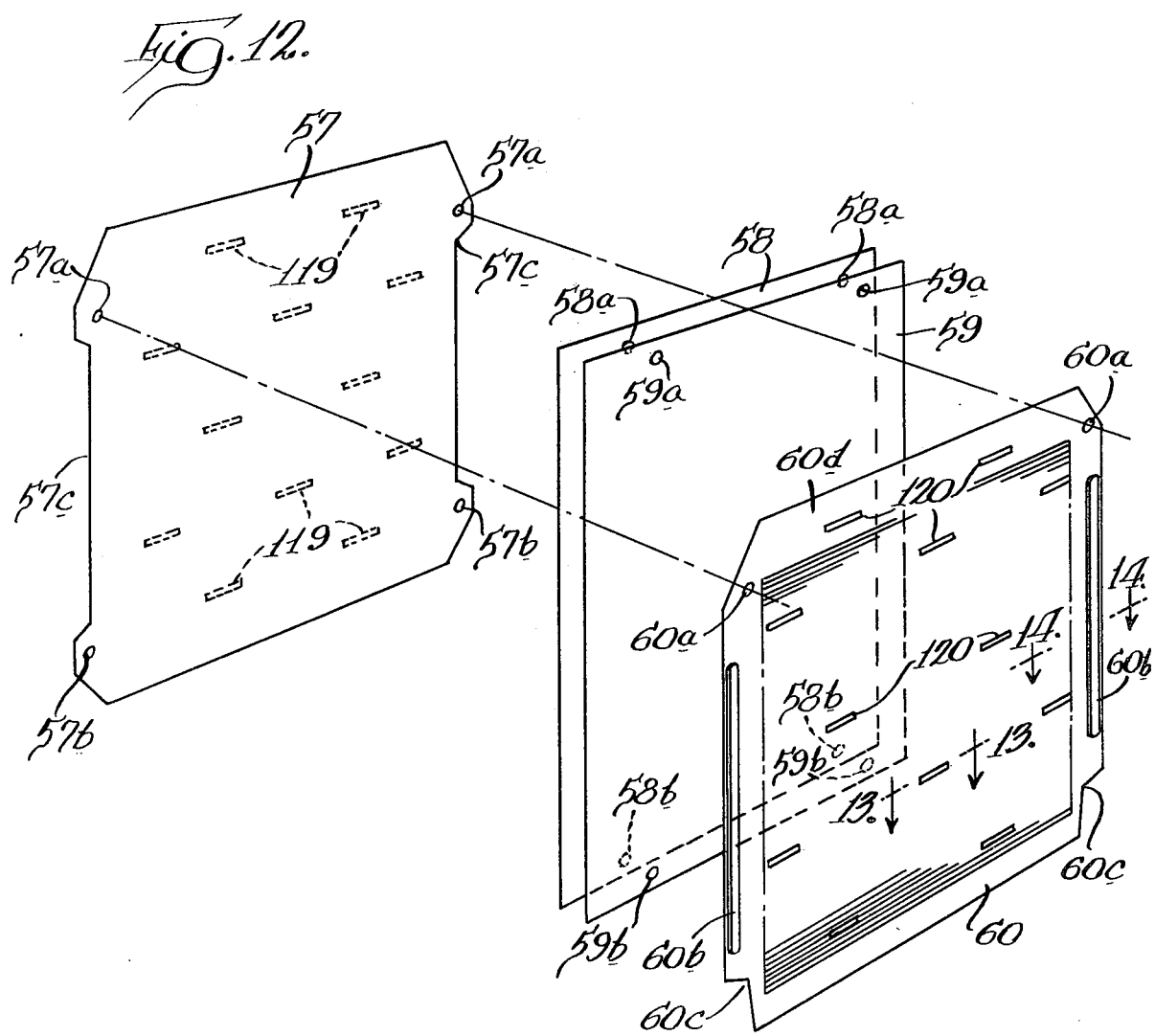
FIG. 12 is an exploded perspective view of the diffuser film, the strip image transparency sheet, the slip sheet, and the grid sheet.

Referring to the drawings in greater detail, and referring first to FIGS. 1 to 6, the apparatus of the present invention includes a housing, indicated generally at H; illuminating means, indicated generally at L, in the rear of the housing; a chassis, indicated generally at C, which is a subassembly mounted in the housing that includes the entire operating mechanism.

Referring now especially to FIGS. 1, 3 and 4, the housing H includes a rectangular rear housing structure having a top wall 20, end walls 21, a bottom wall 22, and inturned rear flanges 23 which terminate in a back frame 24. The housing also has a front portion that includes a top wall 25, end walls 26, and a continuous internal flange 28 which defines a rectangular beveled frame; and secured to the beveled flange 28 is a rectangular opaque mask 29 that cooperates with the flange to define a housing front wall affording a frame within which an illuminated display D is visible. The frame 29 and a lenticular screen 30 are both detachably secured to the beveled flange 28 by means of a series of screws such as the screw 31 which threads into a boss 32 as seen in FIG. 2. As shown, the screen lenticules 30a are on the front of the screen and extend transversely. In a display having the image strip dimensions and grid strip dimensions indicated in FIGS. 9 and 10, and hereinafter discussed, the optimum screen has about 44 lenticules per inch. This, of course, varies with changes in image strip widths and grid strip widths. The screen is preferably molded from clear plastic material and is from about 0.10 to 0.125 inches thick. The housing front portion is best seen in FIG. 3 and FIG. 4 to make a continuous friction fit around the entire perimeter of the top wall 25, side walls 26 and bottom wall 27 with inset lips 20a, 21a and 22a at the front ends of the rear housing walls 20, 21 and 22, respectively, so as to be readily removable.

As seen in FIG. 1, the housing H provides a rectangular box with a frame-like front wall; and it may, of course, be provided with any external finish that is compatible with the display D seen through the frame.

A removable back panel 33 is mounted in the housing back frame 24 and provides a support for the illuminating means L which includes fluorescent lamp sockets 34 mounted on inturned end flanges 33a of the back panel 33, a plurality of fluorescent tubes T carried in the sockets 34, a ballast B and a starter S which are mounted, respectively, upon the back plate 33 and upon a bracket 35. In the illustrated embodiment of the apparatus there are two fluorescent tubes T; but for display devices of larger size there may be as many additional tubes as are required to afford generally uniform illumination over the entire area of the display D. As seen in FIG. 2, at the bottom of the back frame 24 is a push button switch Sw which is accessible from outside the housing to control the energization of the fluorescent tubes T and the operation of the reciprocating drive for the strip image transparency sheet. If desired, of course, separate control switches may be provided for the fluorescent tubes and the reciprocating drive. The latter arrangement is convenient because it permits the strip image sheet to be driven to a predetermined point to establish adjustment between the image strips and the transparent grid sheet strip without the rear illumination provided by the fluorescent tubes.

Figures 13, 14:
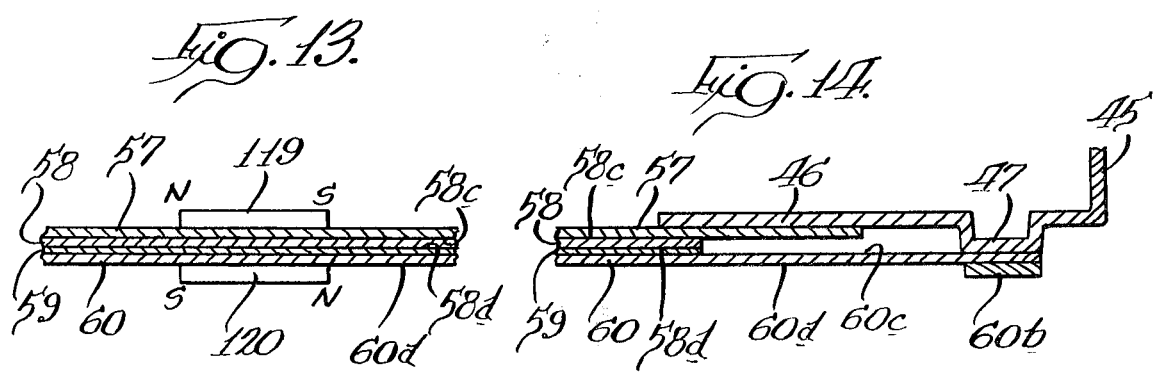
FIG. 13 is a fragmentary section on a greatly enlarged scale taken substantially as indicated along the line 13—13 of FIG. 12.
FIG. 14 is a fragmentary section on the same scale as FIG. 13 taken substantially as indicated along the line 14—14 of FIG. 12.

Referring now particularly to FIGS. 2 to 6, the chassis C has a rectangular frame consisting of top and bottom cross frame angle supports 40 and 41, respectively, and identical upright side frame members 42 (FIGS. 2, 3 and 4) and 43 (FIG. 6). As best seen in FIGS. 2 to 4 and 8, each of the side frame members 42 and 43 includes a transverse rear web 44, a forwardly extending side web 45, and in its central area only a forward transverse web 46 which is best seen in FIG. 14 to have a forwardly projecting vertical spacer rib 47 formed close to the corner between the side web 45 and the forward web 46. As seen in FIGS. 2 and 4 the chassis C is supported in the housing by four heavy hollow posts 48 for mounting bolts 49 and nuts 50, with the forward ends of the bolts extending through the upright webs of the members 40 and 41 and through the transverse rear webs 44 of the side frame members 42 and 43. The foregoing mounting for the chassis C is only one of a variety which might be employed for fixing the chassis C in the housing H at a predetermined distance from the lenticular screen 30 and in a way which does not interfere with removal of the forward housing portion from the rear housing portion for access to the chassis and the components that it carries.

In addition to the frame members 40, 41, 42 and 43 the frame includes a pair of top journal and guide blocks 51 and 52 which are fixedly secured to the upper ends of the side frame members 42 and 43, and lower guide block members 53 and 54 which are secured to the lower ends of the side frame members 42 and 43. Conveniently the members 51, 52, 53 and 54 are plastic moldings which are secured to the side frame members by screws (not shown). The upper journal and guide blocks 51 and 52 provide the journals for a drive shaft and provide upper guides for the strip image sheet carrier, while the lower guide blocks 53 and 54 also assist in guiding the strip image carrier, as will be described in more detail hereinafter.

Finally, the frame of the chassis C also includes an upright angle bracket 55 having a side web 56 which provides a mounting for a reciprocating drive motor as will also be described in detail.

Referring particularly to FIGS. 5, 6, 8 and 12 to 14, the present apparatus includes a diffuser film 57, a strip image transparency sheet 58, a transparent slip sheet 59, and a grid sheet 60. The diffuser film 57, the strip image transparency sheet 58 and the grid sheet 60 are all made of the same sheet material, which is preferably Mylar, and a desirable thickness for the diffuser film and the two sheets is 0.0075 inch. The transparent slip sheet 59 is also of Mylar, but this sheet is preferably only 0.003 inch thick. The diffuser film 57 and the grid sheet 60 are carried on sheet supporting means, indicated generally at 62 in FIGS. 2, 3 and 5 to 8; and adjusting screw means 63 permits vertical adjustment of the grid sheet and angular adjustment of the grid sheet in its vertical plane of adjustment.

The strip image sheet 58 and slip sheet 59 are both mounted upon sheet carrier means, indicated generally at 64. Drive means, indicated generally at 65, reciprocates the carrier means 64 on which the strip image sheet 58 and slip sheet 59 are mounted.

Referring now particularly to FIGS. 6 to 8, the sheet supporting means 62 consists of a pair of left and right hand related brackets 66 (FIG. 4) and 67 (FIGS. 6, 7 and 8). Each of the brackets 66 and 67 includes a mounting web which is in facing relationship to the inner surface of the side frame web 45 and has a headed stud 69 which impales a vertically oriented keyhole slot 70 in said web 45. The brackets 67 also include transverse film supporting flanges 71 which lie behind the forward transverse webs 46 of the side frame members 42 and 43. Each of the brackets 66 and 67 also has an outwardly extending flange 72 which extends through an elongated opening 73 in the web 45 and is threaded to receive the threaded shank 63a of the adjusting screw 63 which is journalled on a screw flange 74 that is struck outwardly from the web 45 to form the opening 73. Accordingly, rotation of the associated adjusting screw 63 produces vertical adjustment of the supporting bracket 66 and 67, as the case may be.

Resilient mounting for securing the upper ends of the diffuser film 57 and the grid sheet 60 to the supporting brackets 66 and 67 comprise pins 75 which impale transverse slots 71a in the bracket webs 71 and have parallel collars 76 by means of which they are slidably retained in the slots 71a. Spring mounting studs 77 on webs 71 receive the lower ends of hairpin springs 78 which have one end 78a anchored to the webs 71 and the opposite end 78b hooked around the pin 75 so as to resiliently urge the pin outwardly toward the web 45 and the side of the housing.

As seen in FIGS. 5 and 12, the diffuser film 57 has upper holes 57a near its side margins and the grid sheet 60 has upper holes 60a which are near its side margins; and the upper holes in both the film and the sheet are positioned to be impaled by the mounting pins 75, and as best seen in FIGS. 6 and 8 the forwardly projecting ends of the pins 75 are then covered by soft plastic retainer caps 79 which hold the films 57 and 60 firmly on the pins 75.

Referring again to FIGS. 5 and 12, and to FIG. 3, near the lower corners of the diffuser film 57 are holes 57b into which tension springs 80 are hooked, and the other ends of said springs are anchored on the ends of a bottom cross rod 81 that project laterally outside the guide blocks 53 and 54. Accordingly, the upper end portion of the diffuser film is resiliently tensioned transversely by the spring loaded pins 75, while the lower end of the diffuser film 57 is resiliently tensioned downwardly and outwardly by the springs 80. The resilience of the springs 78 and 80 is such that they tension the diffuser film 57 to maintain it in a planar position, but they do not interfere with contraction or expansion of the diffuser film which might occur by reason of changes in temperature or humidity.

As best seen in FIGS. 2, 3, 5, 12 and 14 there are vertical strips 60b of magnetic material along the side margins of the grid sheet 60, and when the grid sheet is mounted upon the pins 75 the magnetic strips 60b are in register with the ribs 47 of the side frame members 42 and 43, and either the side frame members are made of ferrous metal or the ribs 47 are coated with a magnetic material so that the magnetic strips 60b cause the sides of the grid sheet 60 to be held firmly against the ribs 47. In order to provide for maximum magnetic attraction between the strips 60b and the ribs 47, and to permit the side margins of the diffuser film 57 to lie flat against the front transverse webs 46 of the side frame members 42 and 43 as seen in FIG. 14, the sides of the diffuser film are recessed as indicated at 57c in FIG. 12. Likewise, as seen in FIG. 12 the bottom corners of the grid sheet 60 are notched as indicated at 60c so that the hooks on the ends of the springs 80 do not interfere with the bottom corners of the grid sheet.

The combined spring loaded pin and magnetic strip mounting of the grid sheet 60 assures that the grid sheet will occupy a planar position parallel to the diffuser film 57, while permitting expansion and contraction of the grid sheet which may occur with changes in temperature or humidity; and the upper mounting holes 57a and 60a of the diffuser film and the grid sheet respectively, fit the mounting pins loosely enough so that the film and the sheet may expand or contract independently even though their upper ends are mounted upon the same pair of spring loaded pins.

As best seen in FIGS. 2 to 6, the carrier means 64 for the strip image transparency sheet 58 and the slip sheet 59 consists of a top cross bar, indicated generally at 82, and a bottom cross bar, indicated generally at 83. The top and bottom cross bars 82 and 83 include, respectively, central angle members 84 and 85 and end assemblies including an upper left hand end assembly 86, an upper right hand end assembly 87, a lower left hand end assembly 88, and a lower right hand end assembly 89. The left and right hand upper end assemblies 86 and 87 are alike except for being of opposite hand, and the lower left and right hand end assemblies 88 and 89 are different from the upper end assemblies but are like each other except for being of opposite hand. The top and bottom left hand end assemblies 86 and 88, respectively, are the more clearly shown in the drawings; and accordingly only those two end assemblies will be described in detail.

Referring first to FIG. 4, the end assembly 86 includes a fastening portion 90 having rearwardly projecting internally threaded bosses 91 to receive screws by means of which the mounting portion 90 of the end assembly is secured to the back surface of an upright web 84a of the upper cross bar angle member 84. The fastening portion 90 at its outer end merges into a forwardly offset carrier arm 92 that is aligned with the upright web 84a, and said carrier arm 92 passes through an upright guide slot 51a in the left hand upper guide and journal member 51. An integral bearing disk 93 at the end of the carrier arm 92 terminates in a spindle 94 of reduced diameter upon which a cam follower roller 95 is journalled and retained in place by a serrated friction washer.

Immediately inside the forward portion of the guide and journal block 51 a forwardly projecting stud 96 on the carrier arm 92 provides a journal for a guide roller 97 which may roll along an inner guiding face 51b of the block 51.

As seen in FIG. 6, the upper right hand end assembly 87 includes a guide roller 98 which may make guiding contact with an inner guide face 52b of the block 52, so that the upper carrier bar 82 is guided between the blocks 51 and 52 and is guided for vertical reciprocation in the slots 51a and 52a.

Referring now to FIG. 3, the bottom cross bar left hand end assembly 88 differs from the top cross bar end assembly 86 only in that it has a carrier arm 99 which extends a substantial distance outside the lower left hand guide block 53, and in that it lacks a spindle end corresponding to the portion 94. The carrier arm 99 is best seen in FIG. 2 to extend through a vertical guide slot 53a in the lower guide block 53; and as seen in FIGS. 5 and 6 a carrier arm 100 of the right hand lower end assembly 89 is guided in a vertical slot 54a in the guide block 54. Further, the end assemblies 88 and 89 of the lower carrier cross bar include guide rollers 101 (FIG. 3) and 102 (FIG. 6) which are positioned to roll along inner guide surfaces of the lower guide blocks 53 and 54 in order to guide the bottom carrier cross bar between said faces.

The strip image transparency sheet 58 and the slip sheet 59 are provided, respectively, with upper mounting holes 58a and 59a and lower mounting holes 58b and 59b which are adapted to be impaled, respectively, by upper mounting pins 103 in the carrier top cross bar and 104 in the carrier bottom cross bar. Said sheets 58 and 59 are then firmly fixed on the pins 103 and 104 by means of flexible plastic retaining caps 105 (FIG. 6) which are like the plastic retainer cap 79 used on the pins 75. Thus, the strip image sheet 58 and the slip sheet 59 are hung from the top carrier cross bar 82, and the bottom carrier cross bar 83 is hung on the bottom of said sheets so that its weight tensions them lengthwise.

In addition to the lengthwise tensioning afforded by the weight of the bottom carrier bar 83, spring studs 106 which project outwardly from both of the bottom guide blocks 53 and 54 (see FIGS. 2, 3 and 6) provide mountings for a pair of torsion springs 107 which are best seen in FIG. 2 to have one end anchored between anchoring lugs 108a and 108b on the lower guide blocks 53 and 54, and to have their opposite ends bearing downwardly upon the projecting end portions of the bottom carrier arms 99 and 100.

In order that the strip image sheet 58 and the slip sheet 59 may be tensioned laterally at their upper and lower ends, each of the mounting pins 103 and 104 is biased laterally outwardly by means which is best seen in FIG. 4. As there illustrated, a mounting pin 103 extends forwardly through a laterally elongated slot 84b in the upright web 84a, and has a rearwardly extending portion 103a which impales a slot 90b in an offset retaining flange 90a of the fastening portion 90; and an enlarged retainer disk 103b of the pin 103 is slidably received between the web 84a and the flange 90a. A tension spring 109 has one end anchored to a projecting rear end 110 of one of the mounting screws for the left hand end assembly 86 and has its other end secured to the rearwardly extending end portion 103a so as to bias the pin 103 laterally outwardly toward the side wall of the housing. Each of the pins 103 and 104 is resiliently biased laterally outwardly toward the housing wall by means identical with that just described. The springs 109 place sufficient lateral tension upon the strip image sheet 58 and the slip sheet 59 to maintain them in a planar condition, but at the same time the springs are soft enough that said sheets 58 and 59 may expand and contract with changes in temperature and humidity if necessary.

The drive means 65 for reciprocating the strip image sheet 58 and slip film 59 includes a cross shaft 111 (FIGS. 3, 5 and 6) which is journalled in the guide and bearing blocks 51 and 52; and keyed to the end portions of the shaft 111 beneath the cam follower rollers 95 is a pair of identical, conjugate cams 112 upon which the cam follower rollers 95 are supported.

Mounted upon the side web 56 of the angle bracket 55 is a geared electric motor 113 which has an output shaft 114 that is connected by a coupling sleeve 115 with the end of the shaft 111 so that, when the motor 113 is energized the conjugate cams 112 are driven at one rpm so as to slowly reciprocate the strip image sheet 58 and the slip sheet 59 between the diffuser film 57 and the grid sheet 60.

Referring now to FIGS. 9 and 10, which accurately illustrate on a greatly enlarged scale the dimensional relationships between the strip image sheet 58 and the grid sheet 60, the image strips of two successive sets of such strips on the strip image sheet 58 are indicated by reference numerals 116a, 116b, 116c, 116d; and 216a, 216b, 216c, 216d. Parts of adjacent sets are numbered 016c and 016d, and 316a and 316b. Strips 116a, 216a and 316a, in combination with additional strips which occupy the same relative position on the strip image sheet 58, collectively produce a first visual effect when they are aligned with the transparent strips 117 of the grid sheet 60; and as seen in FIG. 9 when the center lines of the a strips register with the center lines of the transparent strips 117 the b strips, the c strips, and the d strips are all concealed behind opaque strips 118 of the grid sheet. Thus the distance between the center lines of the transparent strips 117 is equal to the distance between the center lines of the a strips, or of the b strips, etc. As indicated on FIG. 9 each of the transparent grid strips 117 is 0.025 inch wide, while each of the image strips is 0.040 inch wide; so that when the center lines of a set of the image strips is aligned with the center lines of the transparent grid strips only three-fifths of each image strip is visible through the transparent grid strip. The opaque grid strips 118 are 0.135 inch wide; and the distance between the center lines of adjacent transparent grid strips 117 is 0.160 inch.

When a display using image strips and transparent and opaque grid strips of the foregoing dimensions is viewed from a normal distance of 12 to 15 feet, the visual effect is not objectionably discontinuous even if the display is seen without the lenticular screen 30; and when the lenticular screen 30 is in place the visual effect is comparable to that of a rather grainy television picture.

As the strip image sheet 58 moves continuously behind the grid sheet 60 in an upward direction the a visual effect gradually dissolves into the b visual effect which appears to remain in view for a brief period of time and then dissolves into the c visual effect, and so on. A single revolution of the conjugate cams 112 moves the strip image transparency 58 through a complete cycle a, b, c, d, c, b, a, in a period of one minute.

The use of transparent grid strips 117 which are considerably narrower than the image strips 116a etc., permits the strip image transparency 58 to be moved continuously, rather than intermittently; and yet each of the four different visual effects appears to remain in view for an appreciable period of time and then dissolve into the next.

As previously indicated, the adjusting screws 63 for the grid sheet 60 permit that sheet to be adjusted endwise vertically and also angularly in its plane. The endwise adjustment, of course, permits the grid screen to be "fine tuned" with respect to the strip image sheet so that when the strip image sheet is at the lower end of its path of reciprocation the a image strips all have their center lines perfectly aligned with the center lines of the transparent grid strips 117. The angular adjustment of the grid sheet permits different visual effects to be produced as one visual effect dissolves into the next. When the image strips and the transparent strips are perfectly parallel as illustrated in FIG. 9, one entire visual effect dissolves into the next simultaneously across the entire width of the display. By adjusting the grid sheet so that the transparent strips 117 are at an angle with respect to the image strips one visual effect appears to dissolve into the next starting at one side of the screen and moving across to the other side.

With the dimensions of lenticules 30a, image strips 116 and guide strips 117 and 118 heretofore described, the distance from the front of the grid sheet 60 to the back of the screen 30 should be about 0.50 inch.

It is essential in the described embodiment that the strip image sheet 58 and the slip sheet 59 be in firm contact with one another and with the grid sheet 60 in order to prevent undesirable visual phenomena such as parallax which occur when there is excessive space or irregular space between the image strips and the transparent grid strips. In order to assure such contact, narrow, transversely elongated magnet means such as bar magnets 119 and 120 are mounted, respectively, on the rear face 57d of the diffuser film 57 and on the forward face 60d of the grid sheet 60 as illustrated in FIGS. 12 and 13. The magnets 119 and 120 are all in register with one another when the diffuser film and the grid sheet are mounted on the pins 75; and in order that they may not interfere with the appearance of the display the magnets are, of course, positioned in the opaque areas 118 of the grid screen. As indicated in FIG. 13, for bar magnets a north pole N of a magnet 119 is aligned with a south pole S of a magnet 120, and vice versa, so that the magnets draw the diffuser film 57 and grid sheet 60 toward one another throughout their entire areas and thus firmly sandwich the strip image sheet 58 and slip sheet 59 between them.

Magnet means which do not manifest the distinct polarity of bar magnets also are employed in the same manner. For example, the sheets can be similarly sandwiched between pairs of ceramic magnet strips or pieces of rubber or plastic material carrying dispersions of magnetic particles. One of each pair can be nonmagnetized iron or other ferrous material and only the other of each pair need be magnetized.

Referring further to FIGS. 12 to 14, the strip image sheet 58 has a plane surface 58c in contact with the diffuser film 57, and the image strips are applied to the front face 58d of the sheet 58 as by lithography or the like. Similarly, the grid sheet 60 has the opaque strips 118 lithographed on its front surface 60d, and its rear surface 60e is plain. The slip sheet 59 between the strip image sheet and the grid sheet protects the image strips from damage as sheet 58 is reciprocated; but because the slip sheet 59 is connected to the strip image sheet 58 only at the mounting pins 103 and 104, rather than being laminated to it, any problems due to differential shrinkage of those sheets or discoloration of laminating adhesive are avoided.

Referring now to FIG. 11, which shows an alternative embodiment that includes some structural changes in the upper end of the chassis frame and an alternative mounting for the upper carrier cross bar, a chassis, indicated generally at C2, includes a top cross frame member 240 and an upright side frame member 242 having a transverse rear web 244 that is to the rear of the top frame 240, a side web 245, and a forward transverse web 246. A bracket plate 256 provides a mounting for drive means 265. A sheet carrier top cross bar assembly, indicated generally at 282, includes a mounting arm 292 which is pivoted at 292a near the rear upper corner of the bracket plate 256 and extends forwardly where it has a right angle mounting flange 292b to which a cross angle 284 is bolted. A laterally extending stub shaft 294 near the forward end of the carrier arm 292 provides a journal for a cam follower 295.

The drive means 265 includes a cross shaft 311 journalled in the side web 245, and the shaft 311 has an end portion positioned outside said web 245 on which a cam 312 is mounted, and the cam follower roller 295 rests upon the cam 312.

A drive motor 313 is mounted on the bracket plate 256 to the rear of the side frame member 242 and has a shaft 314 which extends through a hole in the bracket plate. Intermeshing gears 315a and 315b are mounted, respectively, on the shafts 314 and 311 in order to drive the shaft 311 and cams 312 from the motor 313. Except for the above described modifications, the second embodiment of the apparatus is the same as the first; and of course the parts 256, 292, 292a, 294, 295 and 312 have their exact counterparts on the opposite side of the frame.

The carrier arms 292 are long enough that with the very small reciprocating motion of only 0.12 inch which is imparted to the strip image sheet 58, the slight arcuate movement of the carrier top frame member 282 about the pivot 292a is unobjectionable.

The dwell of each illuminated view of another embodiment of the display of this invention can be modified or developed completely by a change in position of the viewer or a change by the viewer in his angle of viewing the display. This embodiment of the display utilizes a change in or movement of the viewing position to animate the display by shifting the illuminated view from one set of exposed strip images to another. The above described means for shifting the strip image sheet 58 and the grid sheet 60 relative to one another may be eliminated or be inactive or it may be operated so that a viewer position change or motion modifies its action.

For this variation the strip image transparency sheet 58, transparent slip sheet 59a and grid sheet 60 are arranged as shown in FIG. 10A. The slip sheet 59a has substantial thickness relative to the transparent strips 117 of the grid sheet. For example, the clear slip sheet 59a may be 0.010 inches thick, the image strips 016d, 116a, 116b, etc. of image sheet 58 also are 0.010 inch wide, the transparent strips 117 of the grid sheet are 0.005 inch wide and its opaque strips 118 are 0.040 inch wide. The grid sheet 60, slip sheet 59a and image transparency sheet 58 are held together as a unit by magnetic means hereinabove described or in this embodiment, rather than a slip sheet, other spacing means may be used to maintain a clear space between the grid sheet 60 and image transparency sheet 58.

With the image transparency sheet and grid sheet spaced a fixed distance from one another, the illuminated view developed by correspondence of the transparent strips 117 of the grid sheet to expose a set of image strips such as 116a, 216a, etc. is animated or changed merely by movement of the viewer from position B to position A, for example, in FIG. 10A. There the set of image strips 116b, 216b, etc. become exposed to the viewer. Similarly from position C of FIG. 10A the set of image strips including 016d, 116d, etc. become visible. Since the image strips 016d, etc. of this embodiment are twice as wide as the transparent grid strips 117, each illuminated view dwells for a short time as the viewer moves from position B to A or to C and then fades into the next view merely by angular movement of the viewer and of the grid and image strips relative to one another. Thus, the desired change of view can be achieved by oscillating or rotating the entire device before a viewer who may or may not be moving, or by a viewer moving with respect to a stationary device.

The relative time of dwell for each view thus is established by or is modified by movement of the viewing position or viewing angle. With fixed image and grid sheets the rate of the change between the angle of the viewer and the image sheets determines the dwell or length of time for viewing each set of image strips before the merging with an adjacent set of image strips and then the shifting to the next set of image strips completely. The dwell also is governed by the spacing between the grid sheet and image transparency sheet and can be modified by changing that dimension. The dwell, too, is governed by the ratio of the transparent grid strips to the image strip width.

It also will be apparent for this embodiment of the invention that, rather than having separate grid and slip and image sheets, all three may be an integral structure such as a slip sheet of appropriate thickness with the image strips printed on one side and the grid pattern printed on the other.

The foregoing detailed description is given for clearness of understanding only and no unnecessary limitations should be understood therefrom, as modifications will be obvious to those skilled in the art.

I claim:

1. In an illuminated display device having illuminating means for projecting generally uniformly diffused light toward a viewer, means between said illuminating means and a viewer providing an animated display, said means comprising, in combination:

a strip image transparency sheet which has a plurality of image strips of identical width having parallel longitudinal center lines and effectively abutting edges, said strips being arranged in successive sets that consist of at least two image strips, the first image strips in all the sets collectively forming a first visual image and the second image strips in all the sets collectively forming a second visual image, and each image strip having image forming components occupying the entire space between its edges;

a grid sheet closely adjacent and parallel to said strip image transparency sheet, said grid sheet consisting wholly of parallel alternate opaque strips of equal width and transparent strips of equal width, the longitudinal center lines of successive transparent strips being the same distance apart as are the longitudinal center lines of the first image strips of successive sets, and the width of said transparent strips being materially less than the width of the image strips by a ratio of not less than about 5 to 8, so that when the longitudinal center lines of any one set of image strips are aligned with the longitudinal center lines of the transparent grid strips the image forming components along the side portions of the one set of image strips, and also the entirety of each other set of image strips, are concealed from view by the opaque strips of the grid sheet;

and means permitting the first image strips and the second image strips to be viewed successively through the transparent grid strips, the materially greater width of the image strips as compared to that of the transparent grid strips causing each visual image to appear to the viewer to remain in view for a discrete time span and then dissolve into the next visual image as a result of continuous relative motion between any two of the viewer, the transparency sheet, and the grid sheet.

2. The combination of claim 1 in which the strip image transparency sheet and the grid sheet are substantially in facing contact with one another so as to avoid parallax, and means are provided for continuously shifting the strip image transparency sheet and the grid sheet relative to one another in a direction substantially normal to the center lines of the image strips so as to cause the first image strips and the second image strips to be viewed successively through the transparent grid strips.

3. The combination of claim 1 which includes means spacing the strip image transparency sheet and the grid sheet apart by a predetermined distance which is sufficient that relative movement between a viewer, the grid sheet and the transparency sheet causes the first image strips and the second image strips to be viewed successively.

4. The combination of claim 3 in which the ratio of the width of the image strips to the width of the transparent grid strips is about 2 to 1.

5. The combination of claim 3 in which the means spacing the strip image transparency sheet and the grid sheet apart comprises a transparent member many times thicker than either of the sheets, and in which the transparency sheet and the grid sheet abut opposite surfaces of the transparent member.

6. The combination of claim 5 in which the thickness of the transparent member is of the order of the width of the image strips.

7. The combination of claim 5 in which the transparent member and the grid sheet are integral.

8. The combination of claim 5 in which the transparent member, the grid sheet and the strip image transparency sheet are integral.

9. The combination of claim 1 in which the center lines of the image strips are parallel to the center lines of the transparent strips of the grid sheet, so that each visual image appears to dissolve into the next visual image simultaneously throughout the entire extent of the images.

10. The combination of claim 1 in which the center lines of the image strips and the center lines of the transparent strips of the grid sheets are slightly out of parallelism with one another, so that each visual image appears to dissolve into the next visual image progressively from one margin of the images to the other margin of the images.

11. The combination of claim 1 which includes a lenticular screen between the animated display means and a viewer, said lenticular screen being parallel to and spaced from said animated display means.

* * * * *